United States Patent
Park et al.

(10) Patent No.: US 9,218,312 B2
(45) Date of Patent: Dec. 22, 2015

(54) MEMORY DEVICE AND MEMORY SYSTEM INCLUDING THE SAME

(75) Inventors: Kyu-Min Park, Bucheon-si (KR); Byoung-Sul Kim, Suwon-si (KR); Hak-Yong Lee, Suwon-si (KR); Jun-Ho Jo, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 930 days.

(21) Appl. No.: 13/210,591

(22) Filed: Aug. 16, 2011

(65) Prior Publication Data

US 2012/0042116 A1    Feb. 16, 2012

(30) Foreign Application Priority Data

Aug. 16, 2010    (KR) .................. 10-2010-0078834

(51) Int. Cl.
*G06F 12/00*    (2006.01)
*G06F 13/40*    (2006.01)

(52) U.S. Cl.
CPC .................. *G06F 13/4086* (2013.01)

(58) Field of Classification Search
CPC .................. G06F 12/00; G06F 13/4086
USPC .......................................... 711/102
See application file for complete search history.

(56) References Cited

FOREIGN PATENT DOCUMENTS

| JP | 2000-048149 | 2/2000 |
| JP | 2004-185273 | 7/2004 |
| JP | 2008-041009 | 2/2008 |

*Primary Examiner* — Matthew Bradley
(74) *Attorney, Agent, or Firm* — F. Chau & Associates, LLC

(57) ABSTRACT

A memory device includes an interface unit and a memory unit. The interface unit receives a clock signal, a command signal and a data signal, internally adjusts input impedance based upon at least one of the command signal and the clock signal, and generates internal control signal of the memory device based upon the command signal and data signal. The memory unit performs read/write operations based upon the internal control signal.

14 Claims, 14 Drawing Sheets

MEMORY DEVICE AND MEMORY SYSTEM INCLUDING THE SAME

CROSS-REFERENCE TO RELATED APPLICATION

This application claims under 35 USC §119 priority to and the benefit of Korean Patent Application No. 10-2010-0078834, filed on Aug. 16, 2010, in the Korean Intellectual Property Office (KIPO), the entire content of which are incorporated by reference herein.

BACKGROUND

1. Technical Field

The present disclosure relates to memory devices, and, more particularly, to semiconductor memory devices that internally control an interfacing environment and memory systems including the memory devices.

2. Discussion of the Related Art

Various types of memory devices have been developed to realize high storage capacity in a small size. Recently, nonvolatile memory devices such as flash memory devices are being widely used, even in large and complicated electronic systems such as factory automation systems and intelligent building systems. However, the flash memory devices may not be easily controlled when a proper operating system is not available in the electronic systems that employ the flash memory devices. Thus, various memory devices capable of providing a vendor of the flash memory devices with convenient interfaces have been developed and are broadly employed in the electronic systems. The various memory devices include multi-media cards (MMCs), secure digital (SD) cards, xD cards, and the like, which may be used to provide a relatively simple interface.

Interface environments can have various parameters, such as clock frequencies and impedance differences, which may cause mismatches between the memory devices and the host. Impedance mismatches, for example, can cause reflections of signals from memory devices acting as a load when signals are transmitted from the host, particularly, as operating frequencies increase.

Such mismatches of the interface environments may even cause the host to not recognize the memory devices. Further, increasing demand for high speed data transmission may increase the failure or malfunction of the memory devices.

SUMMARY

In accordance with an exemplary embodiment a memory device capable of internally adjusting impedance that affects the frequency characteristics of signals communicated between an external host and the memory device is provided.

In accordance with an exemplary embodiment a memory system including a memory device capable of internally adjusting impedance that affects the frequency characteristics of signals communicated between a host and the memory device is also provided.

According to exemplary embodiments, a memory device includes an interface unit and a memory unit. The interface unit receives a clock signal, a command signal and a data signal, and internally adjusts input impedance based upon at least one of the data signal and the clock signal. The interface unit generates an internal control signal of the memory device based upon the command signal and the data signal. The memory unit performs read/write operations based upon the internal control signal. The interface unit may include a control unit and a front-end unit. The control unit may generate a frequency adaptation signal based upon the clock signal. The front-end unit may adaptively adjust the input impedance based upon the frequency adaptation signal received from the control unit and transmit the command signal, the clock signal and the data signal to the control unit through a plurality of interface lines while receiving the signals from an external host.

The control unit may include a frequency detector, a front-end controller and an interface controller. The frequency detector may detect frequency of the clock signal to generate operating frequency information. The front-end controller may output the frequency adaptation signal to the front-end unit based upon the operating frequency information. The interface controller may generate the internal control signal using the command signal and the data signal and configured to provide the internal control signal to the memory unit.

The front-end unit may include at least one first circuit and at least one second circuit. The first circuit may be connected in series to a corresponding interface line of the interface lines and may adjust resistive impedance between the memory unit and the external host based upon the frequency adaptation signal. The second circuit may be connected between the corresponding interface line and a voltage line and may adjust capacitive impedance between the memory unit and the external host based upon the frequency adaptation signal.

The first circuit may include a plurality of resistive elements and a plurality of switch elements. The resistive elements may be coupled in parallel each other. The switch elements may be controlled based upon the frequency adaptation signal. Each of the switch elements may be coupled in series to a corresponding resistive element of the resistive elements.

The second circuit may include a plurality of capacitive elements and a plurality of switch elements. The capacitive elements may be coupled in parallel each other. The switch elements may be controlled based upon the frequency adaptation signal. Each of the switch elements may be coupled in series to a corresponding capacitive element of the resistive elements.

The interface unit may further include a power detector. The power detector may detect timing when power is supplied before a data communication mode to generate a power-on signal. The control unit may generate the frequency adaptation signal in response to the power-on signal.

The control unit may include a front-end controller and an interface controller. The controller may receive operating frequency information through the data signal and may generate the frequency adaptation signal based upon the operating frequency information to output the frequency adaptation signal to the front-end unit. The interface controller may generate the internal control signal using the command signal and the data signal and may provide the internal control signal to the memory unit.

In an exemplary embodiment, the interface unit may generate operating frequency information based upon the clock signal before an initialization mode of the memory device without external commands and may adaptively adjust the input impedance based upon the operating frequency information.

The memory device may be a multi-media card (MMC) memory device. The initialization mode may correspond to a card identification mode of MMC interface. The interface unit may store the operating frequency information into reserved registers of card specific data (CSD) registers of the MMC memory device.

In an exemplary embodiment, the interface unit may adjust the input impedance based upon at least one interface initialization command received through the command signal, before a data communication mode.

The memory device may be a multi-media card (MMC) memory device. The data communication mode may correspond to a data transfer mode of MMC interface. The interface initialization command may be defined using a reserved command region. The interface unit may generate and store impedance setup information into reserved registers of card specific data (CSD) registers of the MMC memory device.

The interface initialization command includes a first through a fourth command. In response to the first command, the interface unit may detect frequency of the clock signal to generate the operating frequency information and may store the operating frequency information into registers of the interface unit. In response to the second command, the interface unit may transmit impedance setup information representing current setting of the input impedance. In response to the third command, the interface unit may generate a frequency adaptation signal based upon the operating frequency information and may adjust the input impedance based upon the frequency adaptation signal. In response to the fourth command, the interface unit may modify the impedance setup information based upon the adaptively adjusted input impedance, may store the modified impedance setup information into the registers and may transmit the modified impedance setup information.

In an exemplary embodiment, the interface unit may receive operating frequency information from an external host, may generate a frequency adaptation signal based upon the operating frequency information, and may adaptively adjust the input impedance based upon the frequency adaptation signal.

In an exemplary embodiment, the interface unit may transmit operating frequency information generated based upon the clock signal to an external host and may adaptively adjust the input impedance based a frequency adaptation signal generated by the external host based upon the operating frequency information.

According to exemplary embodiments, a memory device includes an interface unit and a memory unit. The interface unit receives a clock signal, a command signal and a data signal from an external host, internally adjusts input impedance based upon at least one of the data signal and the clock signal, and generates an internal control signal of the memory device based upon the command signal and the data signal. The memory unit performs read/write operations based upon the internal control signal. The interface unit includes a control unit configured to generate operating frequency information based upon the clock signal and configured to output the operating frequency information to the external host, and a front-end unit configured to adaptively adjust the input impedance based upon a frequency adaptation signal received from the external host and configured to transmit the command signal, the clock signal and the data signal to the control unit through a plurality of interface lines. The frequency adaptation signal is generated by the external host based upon the operating frequency information.

In an exemplary embodiment, the control unit includes a frequency detector configured to detect frequency of the clock signal to generate the operating frequency information based upon the detected frequency, and an interface controller configured to output the operating frequency information to the external host. The front-end unit adaptively adjusts the input impedance based upon the frequency adaptation signal.

In an exemplary embodiment an input impedance adjustment apparatus of an interface unit between an external host and a memory unit is provided. A variable impedance unit is coupled between the external host and the memory unit. The variable impedance unit is responsive to impedance adjustment signals based upon a present operating frequency of signal transmission between the external host and the memory unit, such that the input impedance of the interface unit is adjustable to correspond to optimized input impedance values associated with the present operating frequency.

The present operating frequency may be provided by the external host or be detected by the interface unit.

The variable impedance unit may include a variable resistance unit and a variable capacitance unit.

An impedance adjustment signal provided to the variable impedance unit may include a resistance adjustment signal that is applied to the variable resistance unit and a capacitance adjustment signal that is applied to the variable capacitance unit, the impedance adjustment signal providing input resistance and capacitance value information based upon the selection of an input impedance value for the present operating frequency from input impedance values for a range of operating frequencies.

BRIEF DESCRIPTION OF THE DRAWINGS

Illustrative, non-limiting exemplary embodiments will be more clearly understood from the following detailed description taken in conjunction with the accompanying drawings.

DETAILED DESCRIPTION

Figure 1:
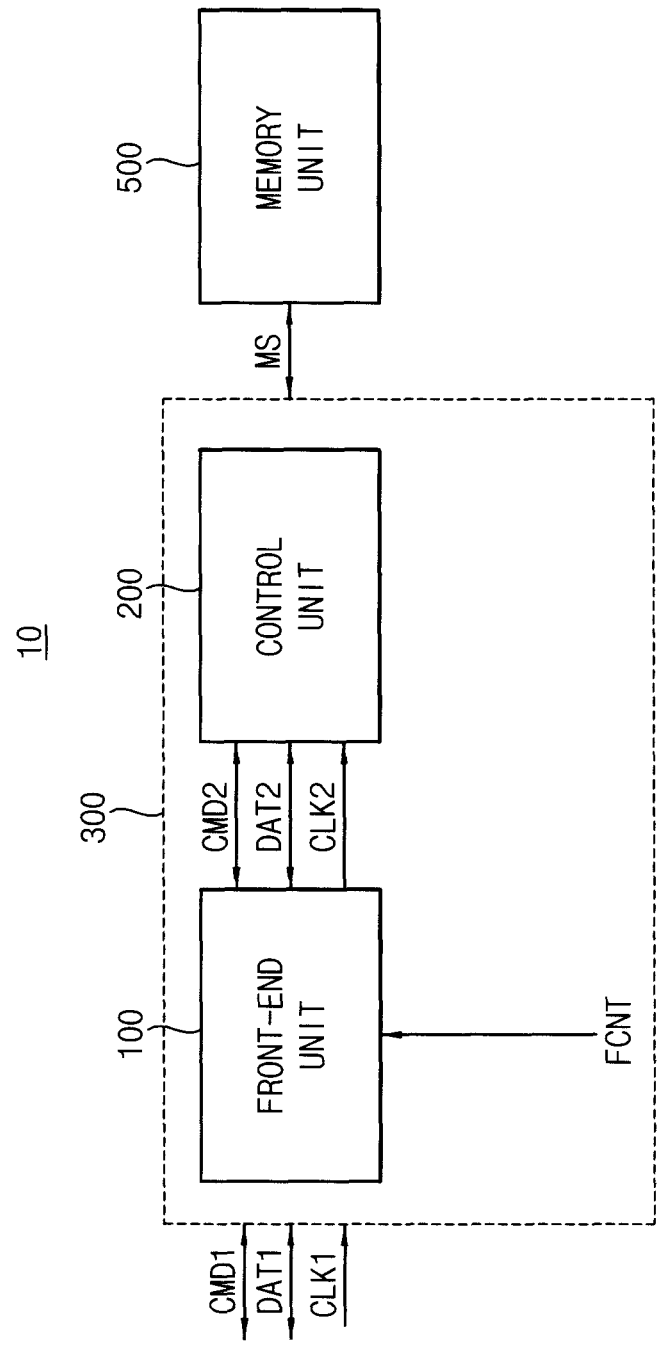
FIG. 1 is a diagram illustrating a memory device according to an exemplary embodiment.

Various exemplary embodiments will be described more fully hereinafter with reference to the accompanying drawings, in which exemplary embodiments are shown. The present inventive concept may, however, be embodied in many different forms and should not be construed as limited to the exemplary embodiments set forth herein. In the drawings, the layout and relative sizes of elements may be exaggerated for clarity. Like numerals refer to like elements throughout.

It will be understood that, although the terms first, second, third and the like may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," and the like.).

FIG. 1 is a diagram illustrating a memory device according to an exemplary embodiment.

Referring to FIG. 1, a memory device 10 includes an interface unit 300 and a memory unit 500. The memory device 10 reads out data from or stores data into the memory unit 500, based upon at least one of a clock signal CLK1 and a data signal DAT1 that are received through the interface unit 300 from an external host. The memory device 10 internally adjusts input impedance of the interface unit 300 so that the memory device may operate adaptively depending on various operational environments, for example, various operating frequencies. Thus, memory device 10 may reduce the transmission error rate of the command signal CMD1 and the data signal DAT1. The operating frequency may be, for example, a frequency of the clock signal CLK1. The memory device 10 may be a memory card or a solid state drive/disk (SSD). For example, the memory device 10 may be a portable nonvolatile memory device such as a secure digital (SD) card, a compact flash (CF) card, an xD picture card, a memory stick, a micro drive, a smart media (SM) card, a multi media card (MMC), an embedded MMC, a micro SD card, a MiniSD card, an SD high capacity (SDHC) card, an USB device, and the like.

The input impedance of the memory device 10 represents the impedance between the memory unit 500 and the external host. The external host may be connected with the memory device 10 through the plurality of interface lines that transmit the signals CMD1, CLK1, DAT1 between the external host and the memory unit 500. Each of the interface lines has an input impedance value defining frequency characteristics between the memory device 10 and the external host. The input impedance value may have a resistive impedance value and a capacitive (or inductive) impedance value. Such impedance values can be based upon components such as resistors, capacitors and inductors, and transmission lines and connections interconnecting such components.

The interface unit 300 receives the clock signal CLK1, the command signal CMD1 and the data signal DAT1. The memory device 10 may receive various data through the interface unit 300 according to various operational modes or interface modes. The operational modes may include an initialization mode to initialize the memory device 10, a mode-selection mode to select one of operational modes, a data transmission mode, and the like. The interface unit 300 may receive the signals CLK1, CMD1 and DAT1, using various interfacing methods. The interface unit 300 may be configured to communicate with the external host using interfacing methods such as universal serial bus (USB), multimedia card (MMC) interface, advance technology attachment (ATA), serial-ATA, parallel-ATA, small computer system interface (SCSI), enhanced small disk interface (ESDI), integrated drive electronics (IDE), and the like. Moreover, the interface unit 300 may adaptively interface with the external host depending on the type of memory device 10.

The interface unit 300 may internally adjust input impedance based upon at least one of the data signal DAT1 and the clock signal CLK1 without using additional impedance controlling circuitry that is located externally from the memory device 10. In an exemplary embodiment, the interface unit 300 may receive a frequency adaptation signal FCNT from the external host and may adjust the input impedance based upon the received frequency adaptation signal FCNT. For example, the frequency adaptation signal FCNT may be transmitted through the data signal DAT1 in response to the command signal CMD1. In another exemplary embodiment, the interface unit 300 may internally adjust the input impedance without receiving any control signals or any adaptation data from the external host. As described below with reference to FIGS. 3A, 3B, 3C and 3D, the memory device 10 may include components for changing the input impedance of the interface unit 300. Thus, the memory device 10 may control the input impedance without implementing additional impedance adjusting circuits whether in the external host or adjacent to the memory device 10.

The memory unit 500 receives an internal control signal MS from the interface unit 300. The internal control signal MS may include a memory control signal and a memory data generated based upon the command signal CMD1 and the data signal DAT1. The memory control signal is for controlling the memory unit 500 and the memory data represents data to be stored in the memory unit 500. The memory unit 500 stores or reads out data based upon the memory control signal and the memory data. The interface unit 300 may generate the internal control signal MS based upon the command signal CMD1 and the data signal DAT1, and may output the internal control signal MS to the memory unit 500.

The external host may be an electronic device or a computing system communicating with the memory device 10. For example, the external host may be a desktop computer, a laptop, a workstation, a smart television, a car navigation system, a handheld device, or the like.

Referring again to FIG. 1, the interface unit 300 may include a control unit 200 and a front-end unit 100. The interface unit 300 may receive the command signal CMD1 and the data signal DAT1 through the front-end unit 100. The control unit 200 of the interface unit 300 may perform logical or mathematical operations to perform interface operations according to the interfacing method, such as one involving an Embedded Multi Media Card (eMMC) which is an embedded storage architecture having a Multi Media Card (MMC) interface and flash memory, all in a small surface-mount ball grid array (BGA) package used for integrated circuits. The control unit 200 generates the internal control signal MS based upon the command signal CMD1 and data signal DAT1, where the memory unit 500 perform read/write operations based upon the internal control signal MS. In an exemplary embodiment, the control unit 200 may internally generate control signals to control the front-end unit 100.

The front-end unit 100 may adaptively adjust the input impedance based upon the frequency adaptation signal FCNT received from the control unit 200. The front-end unit 100 may transmit the command signal CMD1, the clock signal CLK1 and the data signal DAT1 to the control unit 200. The signals CMD1, CLK1, DAT1 may be transmitted through a plurality of interface lines. In the exemplary embodiments, the front-end unit 100 is configured to control the input impedance of the interface unit 300 and to transmit the signals CMD1, CLK1, DAT1 without performing active processing on the signals. Thus, the front-end unit 100 may transmit a command signal CMD2, a clock signal CLK2 and a data signal DAT2 to the control unit 200 without changing the frequency characteristics of the signals CMD1, CLK1 and DATA. In this case, the internal signals CMD2, CLK2, DAT2 correspond to the signals CMD1, CLK1, DAT1, respectively. As described below with reference to FIG. 3A, the interface lines may include at least one command line, at least one clock line and at least one data line.

Figure 12:
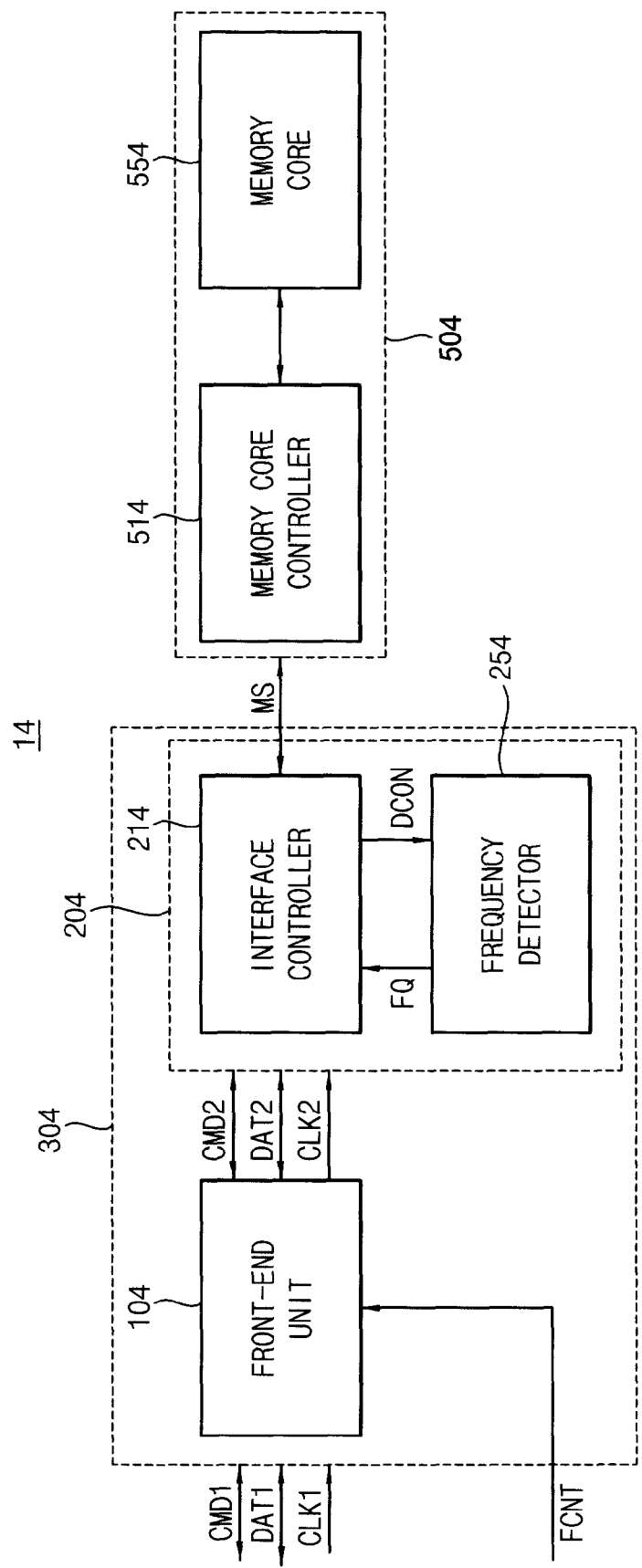

The control unit 200 may generate the frequency adaptation signal FCNT based upon at least one of the data signal DAT1 and the clock signal CLK1. The control unit 200 may generate the frequency adaptation signal FCNT by performing internal detection process or by performing processing on impedance setup information received from the external host. The impedance setup information may include values of the input impedance. The impedance setup information may be transmitted through the data signal DAT2 in response to the command signal CMD2. The control unit 200 may output the frequency adaptation signal FCNT to the front-end unit 100. The control unit 200 may convert the frequency adaptation signal FCNT into a digital form and may output the converted signal to the external host. In this case, the front-end unit 100 may receive the frequency adaptation signal FCNT from the external host, as illustrated in FIG. 12.

The frequency adaptation signal FCNT may be generated based upon an impedance data table that is provided to a vendor of the memory device 10 and stored in the control unit 200. The impedance data table may include a set of optimized input impedance values related to various operating frequencies of the memory device 10. For example, the impedance data table can include multiple input impedance values that match the impedance between the memory device 10 and the external host. Impedance matching helps maximize power transfer from the signal source and a load receiving the signal and/or minimize reflections from the load.

The impedance data table may be stored in registers of the control unit 200. In this case, the control unit 200 may select an impedance value from the impedance data table and may generate the frequency adaptation signal FCNT based upon the selected impedance value. For example, the selected impedance value may correspond to the operating frequency information FQ that represents a current communication environment. Registers may be implemented in the control unit 200 to store the impedance data table and the registers may be defined in relation to an interface protocol between the memory device 10 and the external host.

The registers may be registers in a microprocessor of the memory device 10 or may be other registers in the memory device 10 independently of the microprocessor. The registers may represent reserved regions of pre-defined registers of the memory device. The reserved region can be defined in relation to the interface protocol between the memory device 10 and the external host.

Figure 2:
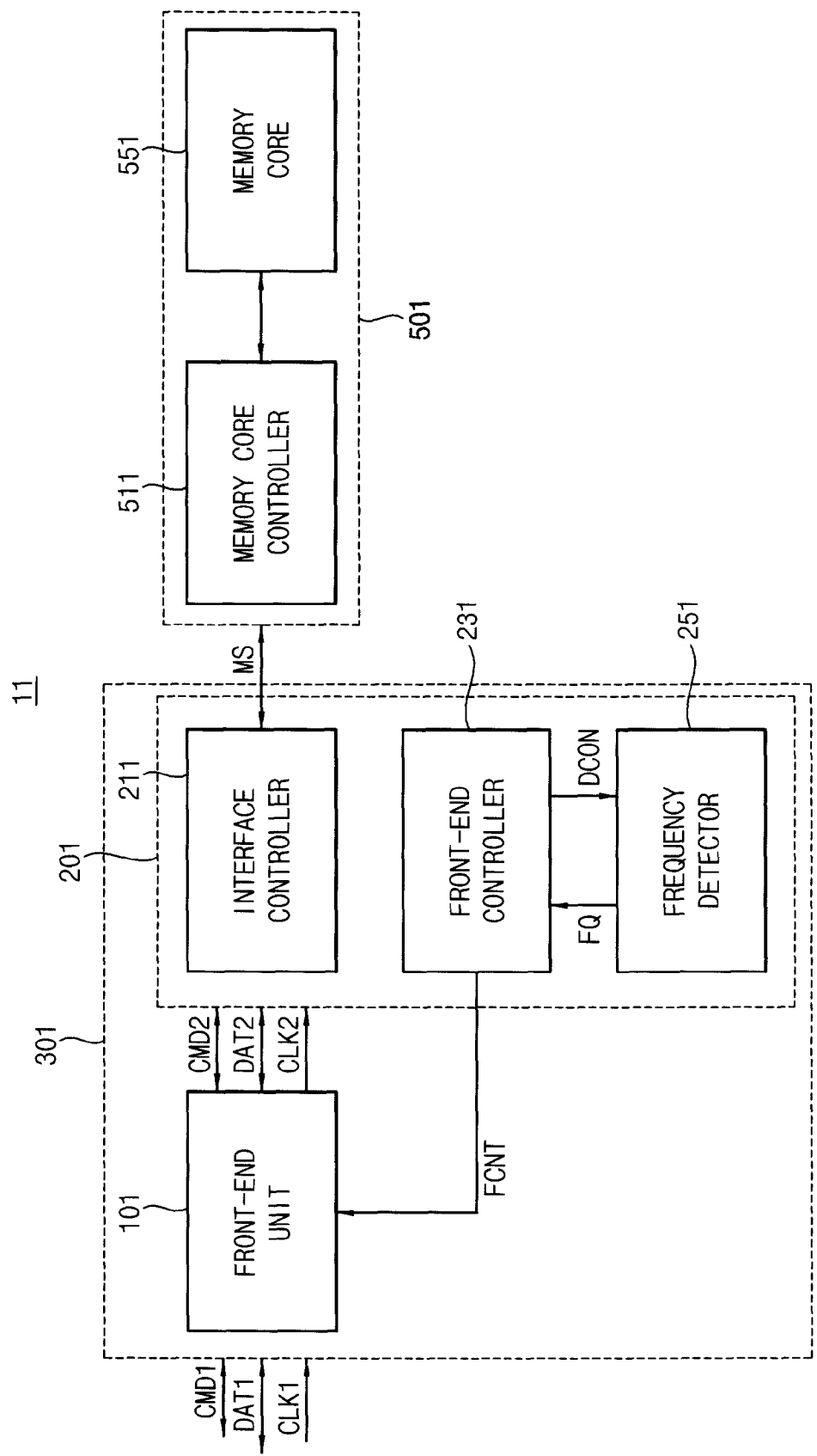
FIG. 2 is a block diagram illustrating an exemplary embodiment of the memory device of FIG. 1.

FIG. 2 is a block diagram illustrating an exemplary embodiment of the memory device of FIG. 1.

Referring to FIG. 2, a memory device 11 includes an interface unit 301 and a memory unit 501. The interface unit 301 may include a front-end unit 101 and a control unit 201. The control unit 201 may include a frequency detector 251, a front-end controller 231 and an interface controller 211.

The interface controller 211 may control the memory unit 501 using the command signal CMD2, the clock signal CLK2 and the data signal DAT2 that are received through the front-end unit 101 from the external host. For example, the interface controller 211 may generate the internal control signal MS using the command signal CMD2 and the data signal DAT2 and may provide the internal control signal MS to the memory unit 501. The frequency detector 251 may detect frequency of the clock signal CLK2 to generate operating frequency information FQ. For example, the detection timing of the frequency detector 251 may be controlled in response to a detecting control signal DCON from the front-end controller 231. The operating frequency information FQ may represent synchronization frequency in which the memory device 11 communicates with the external host through the command signal CMD1 and the data signal DAT1.

The operating frequency information FQ may be provided to the front-end controller 231 and may be stored in a memory space such as registers in the front-end controller 231. In some embodiments, the front-end controller 231 may receive signals from the frequency detector 251 to generate the operating frequency information FQ. The front-end controller 231 may generate the frequency adaption signal FCNT based upon the operating frequency information FQ and provide the frequency adaption signal FCNT to the front-end unit 101, so that the front-end unit 101 may adaptively adjust the input impedance based upon the frequency adaptation signal FCNT.

As described above with reference to FIG. 2, the front-end controller 231 may generate the frequency adaption signal FCNT based upon the operating frequency information FQ independently of the data signal DAT1.

In other embodiments, the interface controller 211 may receive the frequency adaption signal FCNT through the data signal DAT2 in response to the command signal CMD2 and may output the frequency adaption signal FCNT to the front-end controller 231.

In still other exemplary embodiments, the front-end controller 231 may generate the frequency adaption signal FCNT based upon impedance setup information. As mentioned above, the impedance setup information may include a value of the input impedance. The impedance setup information may be received from the external host and may be stored in a memory space such as registers of the interface unit 301.

The memory unit 501 may include a memory core controller 511 and a memory core 551. The memory unit 501 may store an external data into the memory core 551 through the memory core controller 511 based upon the command signal CMD2 and the data signal DAT2. The memory unit 501 may receive the internal control signal MS from the interface unit 301. The internal control signal MS may be generated based upon the command signal CMD2 and the data signal DAT2. As described above, the internal control signal MS may include the memory control signal and the memory data. Thus, the memory unit 501 may store the external data based upon the memory control signal and the memory data.

Figure 3A:
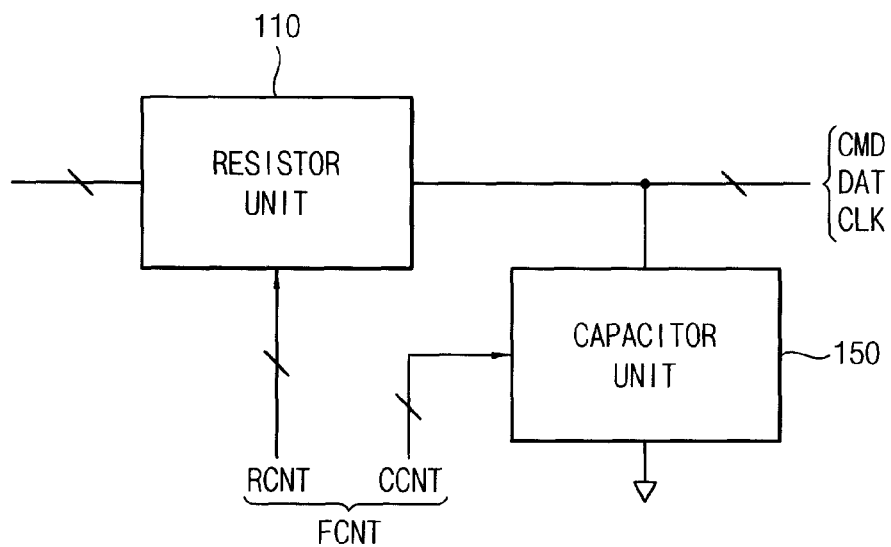
FIG. 3A is a block diagram illustrating an exemplary embodiment of the front-end unit in the memory device of FIG. 1.

FIG. 3A is a block diagram illustrating an exemplary embodiment of the front-end unit of the memory device of FIG. 1.

Referring to FIG. 3A, the front-end unit 100a may include a resistor unit 110 and a capacitor unit 150. The resistor unit 110 may include at least one first circuit and the capacitor unit 150 may include at least one second circuit. The first circuit may be connected in series to a corresponding interface line of the interface lines related to the command signal CMD1, the clock signal CLK1 and the data signal DAT1. The first circuit may adjust resistive impedance between the memory unit 10 and the external host based upon the frequency adaptation signal FCNT. The second circuit may be connected between the corresponding interface line and a voltage line such as a ground line. The second circuit may adjust capacitive impedance between the memory unit 10 and the external host based upon the frequency adaptation signal FCNT.

The frequency adaptation signal FCNT may include a resistance adaptation signal RCNT and a capacitance adaptation signal CCNT. A resistance value of the interface line connected to the resistor circuit 110 may be adjusted based upon the resistance adaptation signal RCNT. A capacitance value of the corresponding interface line connected to the capacitor circuit 150 may be adjusted based upon the capacitance adaptation signal CCNT.

The interface lines may include at least one command line CMD, at least one clock line CLK and at least one data line DAT. For convenience of explanation, the interface lines are assumed to include a single command line CMD and a single clock line CLK.

Figure 3B:
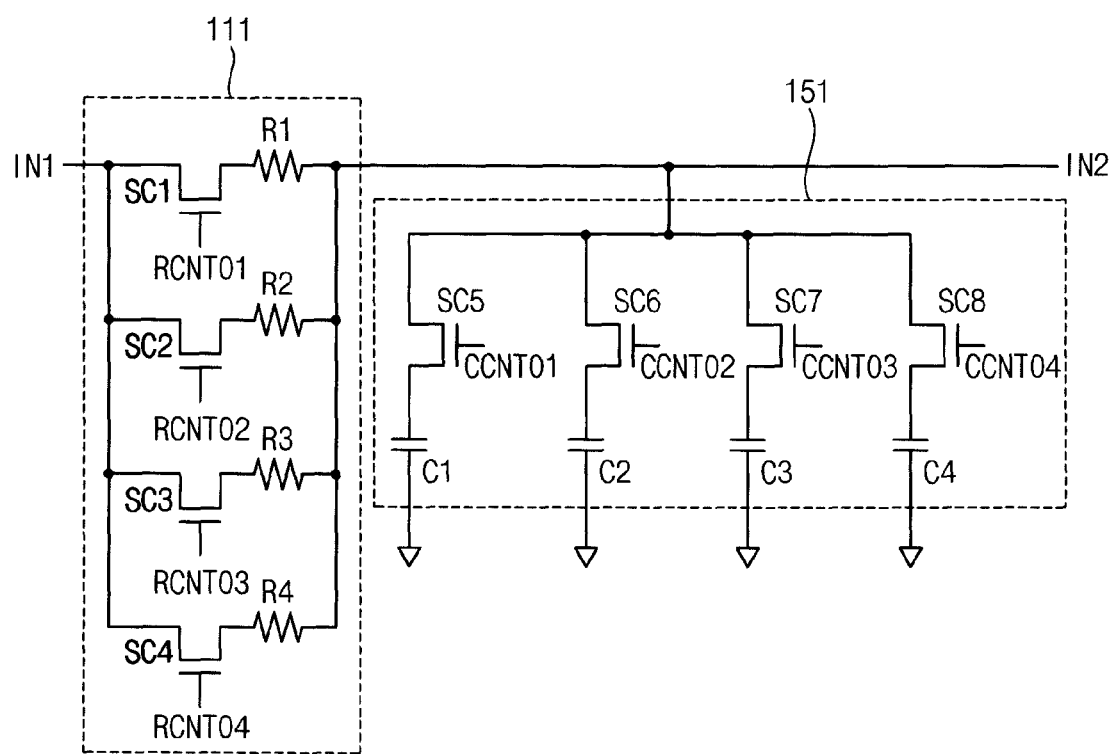
FIGS. 3B, 3C and 3D are diagrams illustrating exemplary connections of each interface line in the front-end unit of FIG. 3A.
Figure 3C:
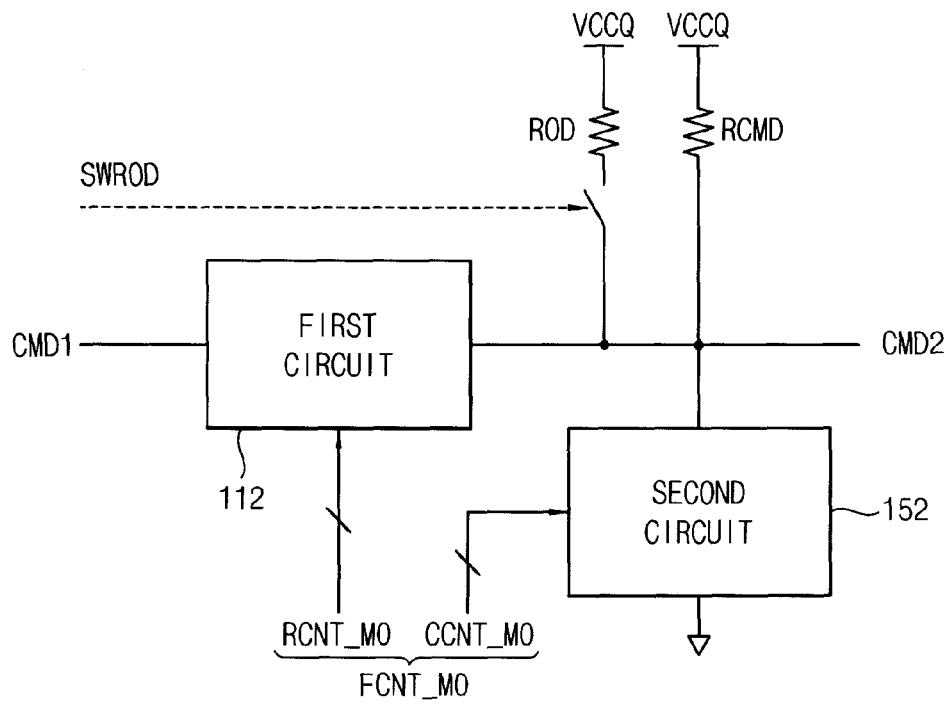
Figure 3D:
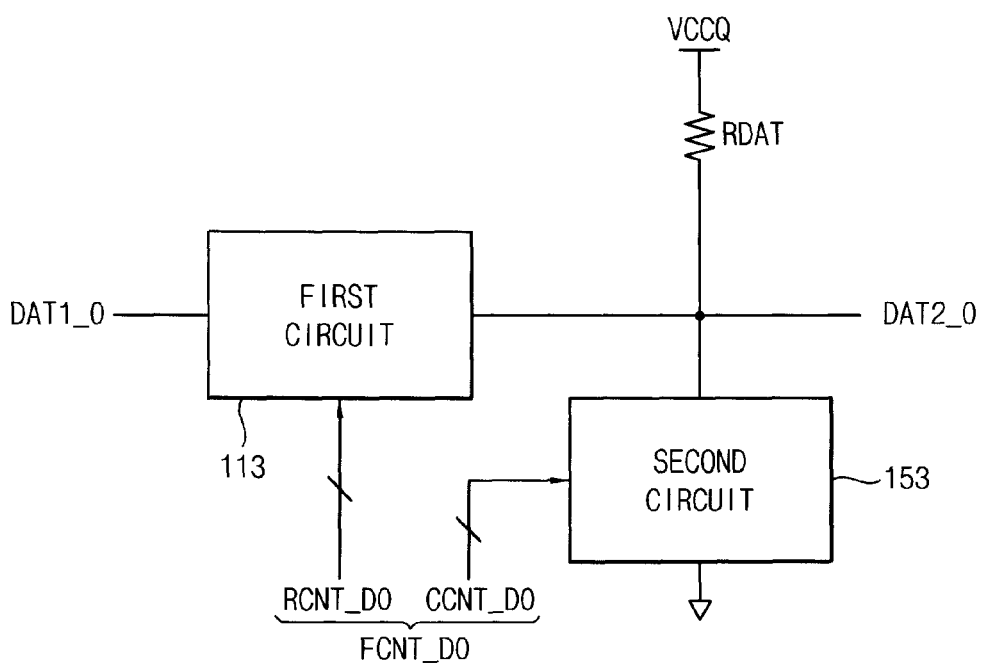

FIGS. 3B, 3C and 3D are diagrams illustrating exemplary connections of each interface line in the front-end unit 100a of FIG. 3A. FIG. 3B illustrates exemplary connections of one interface line. FIGS. 3C and 3D illustrate exemplary connections of the command line CMD1 and the data line DAT1, respectively, for example, a data line DAT1_0 for the least significant bit of the data signal DAT1.

Referring to FIG. 3B, the front-end unit 100a of FIG. 3A may include, for adjusting impedance between a first interface line IN1 and a second interface line IN2, a first circuit 111 and a second circuit 151. The first circuit 111 may be connected between the first interface line IN1 and the second interface line IN2. The second circuit 151 may be connected between the second interface line IN2 and a voltage line such as a ground line. For convenience of illustration, FIG. 3B shows only four resistors in the first circuit 111 and four capacitors in the second circuit 151. The circuits 111, 151 may have an amount of passive elements, such as capacitors and resistors, more or less than those shown in FIG. 3B, and may have also have functions and structures similar to those of the illustrated circuits, whereby the resistance and capacitance can be controlled. For example, variable resistors and variable capacitors which can be varied as a function of frequency can be implemented in an exemplary embodiment.

The first circuit 111 may include a plurality of resistive elements R1, R2, R3, R4 and a plurality of first switch elements SC1, SC2, SC3, SC4. The resistive elements R1, R2, R3, R4 may be coupled in parallel to each other, between the first interface line IN1 and the second interface line IN2. The first interface line IN1 may connect the front-end unit 100a to the external host and the second interface line IN2 may connect the front-end unit 100a to the memory unit 500. Thus, the second interface line IN2 may be referred as an intra-transmission line and the First interface line IN1 may be referred as an inter-transmission line. The first switch elements SC1, SC2, SC3, SC4 may be controlled based upon a plurality of resistance adaptation signals RCNT01, RCNT02, RCNT03, RCNT04, respectively. The resistance adaptation signals RCNT01, RCNT02, RCNT03, RCNT04 may be included in the resistance adaptation signal RCNT of FIG. 3A. Each of the resistance adaptation signals RCNT01, RCNT02, RCNT03, RCNT04 may be a one-bit signal having a logic high level or a logic low level. For example, each of the first switch elements may have an open-state when the one-bit signal has the logic low level and may have a short-state when the one-bit signal has the logic high level. Each of the first switch elements SC1, SC2, SC3, SC4 may be coupled in series to a corresponding resistive element of the resistive elements R1, R2, R3, R4.

The second circuit 151 may include a plurality of capacitive elements C1, C2, C3, C4 and a plurality of second switch elements SC5, SC6, SC7, SC8. The capacitive elements C1, C2, C3, C4 may be coupled in parallel each other, between the second interface line IN2 and a ground line. The second switch elements SC5, SC6, SC7, SC8 may be controlled based upon a plurality of capacitance adaptation signals CCNT01, CCNT02, CCNT03, CCNT04, respectively. The capacitance adaptation signals CCNT01, CCNT02, CCNT03, CCNT04 may be included in the capacitance adaptation signal CCNT of FIG. 3A. Each of the capacitance adaptation signals CCNT01, CCNT02, CCNT03, CCNT04 may be a single bit signal having a logic high level or a logic low level. For example, each of the second switch elements may have an open-state when the single bit signal has the logic low level and may have a short-state when the single bit signal has the logic high level. Each of the second switch elements SC5, SC6, SC7, SC8 may be coupled in series to a corresponding capacitive element of the capacitive elements C1, C2, C3, C4.

In an exemplary embodiment, impedance setup information may include coded digital data. As described above, the impedance setup information for adjusting the input impedance may include signals indicating digitalized code bits of a resistance value and a capacitance value of the front-end unit 100. For example, the impedance setup information may include multiple bits, each of which indicates a corresponding bit of a digitalized frequency adaptation signal. In addition, where the switch elements SC1, SC5 of FIG. 3B are activated and the other switch elements SC2, SC3, SC4, SC6, SC7, SC8 of FIG. 3B are deactivated, the impedance setup information may have a coded digital data of "10001000". The control unit 200 may be implemented to store the impedance data table that includes the coded digital data corresponding to the operating frequency information FQ and representing values of the input impedance according to the operating frequency information FQ. Thus, the control unit 200 may generate the frequency adaptation signal FCNT based upon the operating frequency information FQ or the impedance data table where the frequency adaptation signal FCNT is used to control the passive elements of the front end unit 100.

Referring to FIG. 3C, the front-end unit 100a of FIG. 3A may include, for a first command line CMD1 and a second command line CMD2, a first circuit 112 and a second circuit 152. The first circuit 112 may connected between the first command line CMD1 and the second command line CMD2. The second circuit 152 may be connected between the second command line CMD2 and a voltage line such as a ground line. A frequency adaptation signal FCNT_MO that is for controlling input impedance of the command line CMD1 may include a resistance adaptation signal RCNT_MO and a capacitance adaptation signal CCNT_MO. The first circuit 112 may control resistance of the input impedance based upon the resistance adaptation signal RCNT_MO. The second circuit 152 may control capacitance of the input impedance based upon the capacitance adaptation signal CCNT_MO.

The front-end unit 100a of FIG. 3A, as implemented by the configuration shown in FIG. 3C, may further include a pull-up resistor RCMD and an open-drain resistor ROD for a pull-up mode and an open drain modes, respectively. In a pull-up mode, a pull-up resistor weakly "pulls" the voltage of the wire it is connected to towards its voltage source level when the other components on the line are inactive. In an open-drain mode a single MOS FET transistor circuit is employed, the open-drain referring to the drain terminal of the MOS FET transistor being an output terminal. The pull-up resistor RCMD and the open-drain resistor ROD may connected between a control voltage VCCQ of the memory device 10 and the second command line CMD2. The connection between the open-drain resistor ROD and the second command line CMD2 may be controlled based upon an external control signal SWROD. Thus, the front-end unit 100a of FIG. 3A may further include a switch element to control the connection between open-drain resistor ROD and the second command line CMD2. In an exemplary embodiment, the memory device 10 may further include additional circuitry (not shown) to adaptively control values of the pull-up resistor RCMD and the open-drain resistor ROD based upon the operating frequency information FQ or the data signal DAT1 of FIG. 2.

Referring to FIG. 3D, the front-end unit 100a of FIG. 3A may include, for a first data line DAT1_0 and a second command line DAT2_0, a first circuit 113 and a second circuit 153. The first circuit 113 may be connected between the first data line DAT1_0 and the second data line DAT2_0. For example, one-bit signal (e.g., the least significant bit) of multiple bit data to be transmitted as the data signal DAT1 of FIG. 1 may be transmitted through the first data line DAT1_0 and the second command line DAT2_0. The second circuit 153 may be connected between the second data line DAT2_0 and a voltage line such as a ground line. A frequency adaptation signal FCNT_DO that is for controlling input impedance of the data line DAT1_0 may include a resistance adaptation signal RCNT_DO and a capacitance adaption signal CCNT_DO. The first circuit 113 may control resistance of the input impedance based upon the resistance adaptation, signal RCNT_DO. The second circuit 153 may control capacitance of the input impedance based upon the capacitance adaptation signal CCNT_DO.

The front-end unit 100a of FIG. 3A may further include a pull-up resistor RDAT for a pull-up mode. The pull-up resistor RDAT may be connected between the control voltage VCCQ of the memory device 10 and the second data line CMD2. In an exemplary embodiment, the memory device 10 may further include additional circuitry (not shown) to adaptively control values of the pull-up resistor RDAT based upon the operating frequency information FQ or the command signal CMD1 of FIG. 2.

Figure 4:
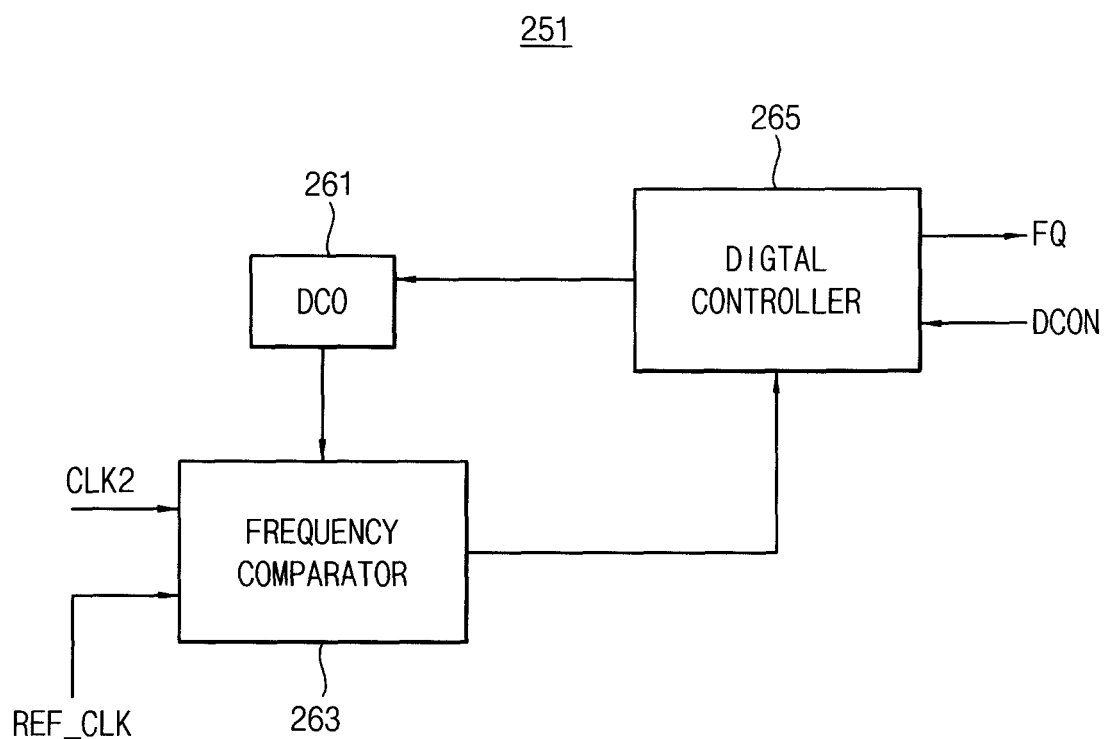
FIG. 4 is block diagram illustrating an exemplary embodiment of the frequency detector of the memory device of FIG. 2.

FIG. 4 is block diagram illustrating an example of the frequency detector of the memory device of FIG. 2.

Referring to FIG. 4, the frequency detector 251 may include a digital controlled oscillator (DCO) 261, a frequency comparator 263 and a digital controller 265. The frequency detector 251 may operate the DCO 261 through the digital controller 265 during a pre-determined period and may output an oscillation signal having an oscillation frequency. While the DCO 261 operates in a normal mode outputting the oscillation signal, the frequency comparator 263 may compare frequency of the oscillation signal to a reference frequency of a reference clock signal REF_CLK. The frequency comparator 263 may provide the digital controller 265 with information indicating whether the oscillation frequency is higher than the reference frequency REF_CLK or information indicating the difference between the frequencies. The reference frequency may be a frequency of the clock signal CLK2 received by the interface unit 301 of FIG. 2. The digital controller 265 may generate or change recursively a digital control code based upon the comparison result and may apply the digital control code to the DCO 261. When the digital control code is converged so that variation of the digital control code is within a pre-determined range, the output frequency of the DCO 261 may be considered to be stabilized. The digital controller 265 may output a frequency code as the operating frequency information FQ. The frequency code indicating the stabilized frequency of the DCO 261 may be a digital code including at least one bit.

Figure 5:
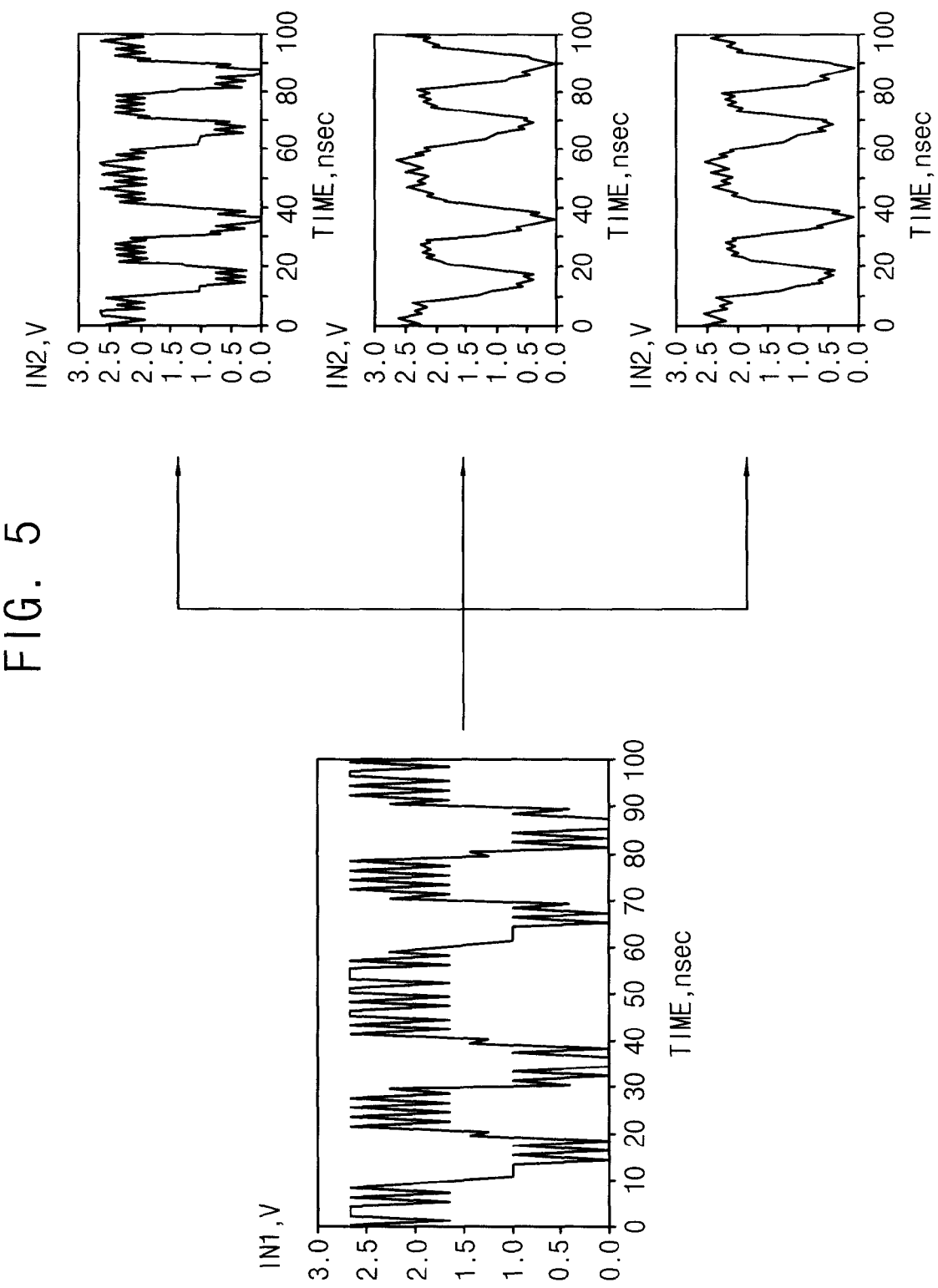
FIG. 5 is a diagram illustrating exemplary embodiments of input signal waveforms of the memory device of FIG. 1.

FIG. 5 is a diagram illustrating examples of input signal waveforms of the memory device of FIG. 1. In FIG. 5, the vertical axis represents voltage V and the horizontal axis represents time with a resolution of a nano second.

Referring to FIG. 3B and FIG. 5, when the switch elements SC1 through SC8 have open-state, a signal having waveform illustrated on the left side of FIG. 5 may be transmitted to the first interface line IN1 from the external host. When the switch elements SC1 through SC8 are controlled based upon the frequency adaptation signal FCNT representing the operating frequency information FQ, three examples of signals received through the second interface line 2 by the control unit 200 are illustrated on the right side of FIG. 5. The examples of the received signals may have various frequency characteristics according to the input impedance adjusted based upon the frequency adaptation signal FCNT. As illustrated in FIG. 5, the control unit 200 may receive signals with improved frequency characteristics through the second interface line IN2. Thus, the memory device 10 may improve the error rate of signals transmitted through the interface lines IN1, IN2. For example, as seen in the middle-right and middle bottom diagrams of FIG. 5, signal high frequency signal variations on top of a lower frequency carrier wave are reduced.

Figure 6:
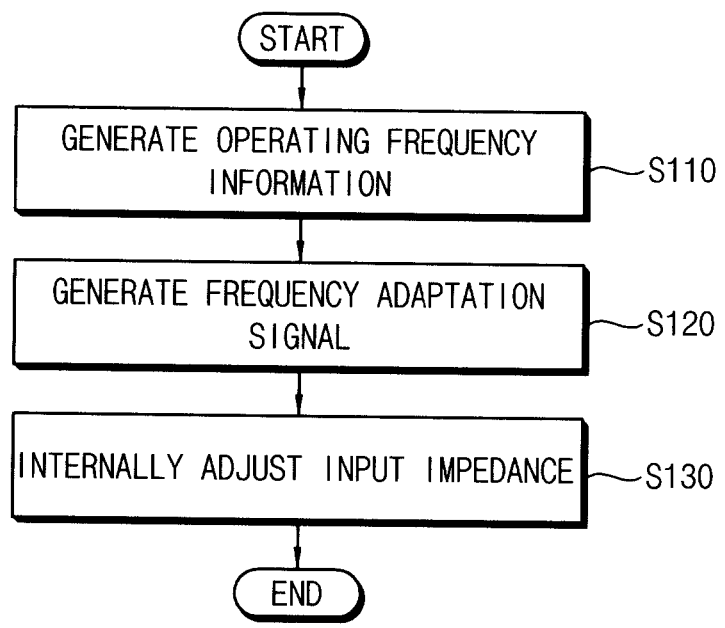
FIG. 6 is a flow chart illustrating a method of controlling a memory device according to exemplary embodiments.

FIG. 6 is a flow chart illustrating a method of controlling a memory device according to an exemplary embodiment.

Referring to FIGS. 1, 2 and 6, the frequency of the clock signal CLK2 may be detected to generate operating frequency information FQ (S110). The frequency adaptation signal FCNT may be generated based upon the operating frequency information FQ (S120). The impedance may be internally adjusted based upon the clock signal CLK1 received from the external host or based upon the frequency adaptation signal FCNT.

In an exemplary embodiment, the steps S110, S120, S140 may be performed without receiving a corresponding external command, before the initialization mode of the memory device. In another exemplary embodiment, the operating frequency information FQ may be generated based upon a first command received from the external host. The steps S110, S120, S140 may be performed by the memory device 10 of FIG. 1 and memory systems of FIGS. 13 and 14, and thus a repeated description will be omitted.

Figure 7:
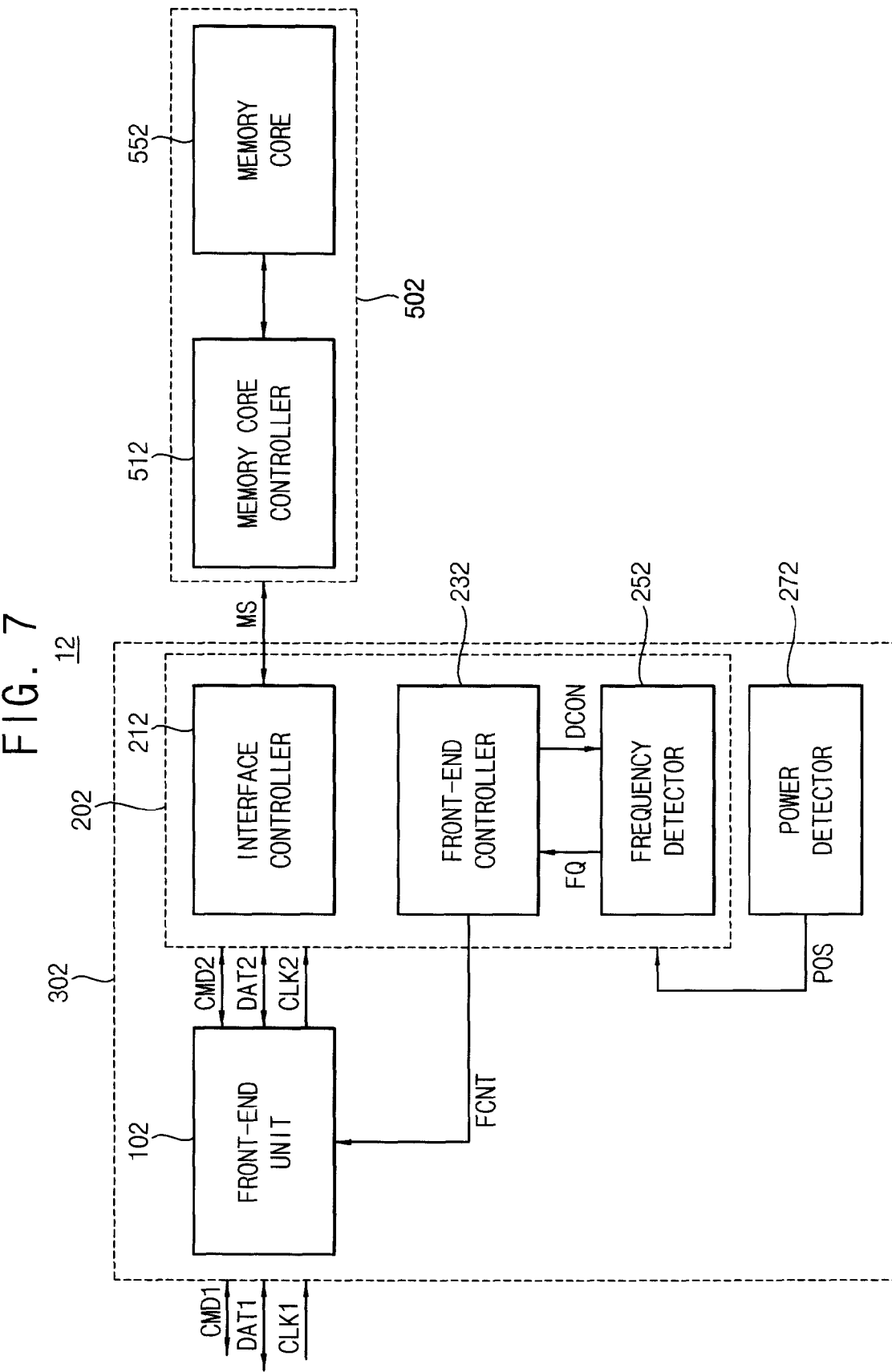
FIG. 7 is a block diagram illustrating an exemplary embodiment of the memory device of FIG. 1.

FIG. 7 is a block diagram illustrating another exemplary embodiment of the memory device of FIG. 1.

Referring to FIG. 7 a memory device 12 includes an interface unit 302 and a memory unit 502. The memory unit 502 may include a memory core controller 512 and a memory core 552.

The interface unit 302 may include a front-end unit 102 and a control unit 202. The control unit 202 may include a frequency detector 252, a front-end controller 232, an interface controller 212 and power detector 272. The power detector 272 may detect a timing when power is supplied to the memory device 12 and may generate a power-on signal POS. The control unit 202 may generate the frequency adaptation signal FCNT based upon the power-on signal POS. The memory device 12 may detect the power using the power detector 272 without receiving a corresponding external command before the initialization mode. The memory device 12 may generate the operating frequency information FQ based upon the clock signal CLK2. Thus, without an impedance controlling process conducted externally, the memory device 12 may control or internally adjust the input impedance based upon the operating frequency information FQ. The memory device 12 of FIG. 7 is similar to the memory device 11 of FIG. 2 except that in FIG. 7, the memory device 12 further includes the power detector 272, and thus a repeated description will be omitted.

Figure 8:
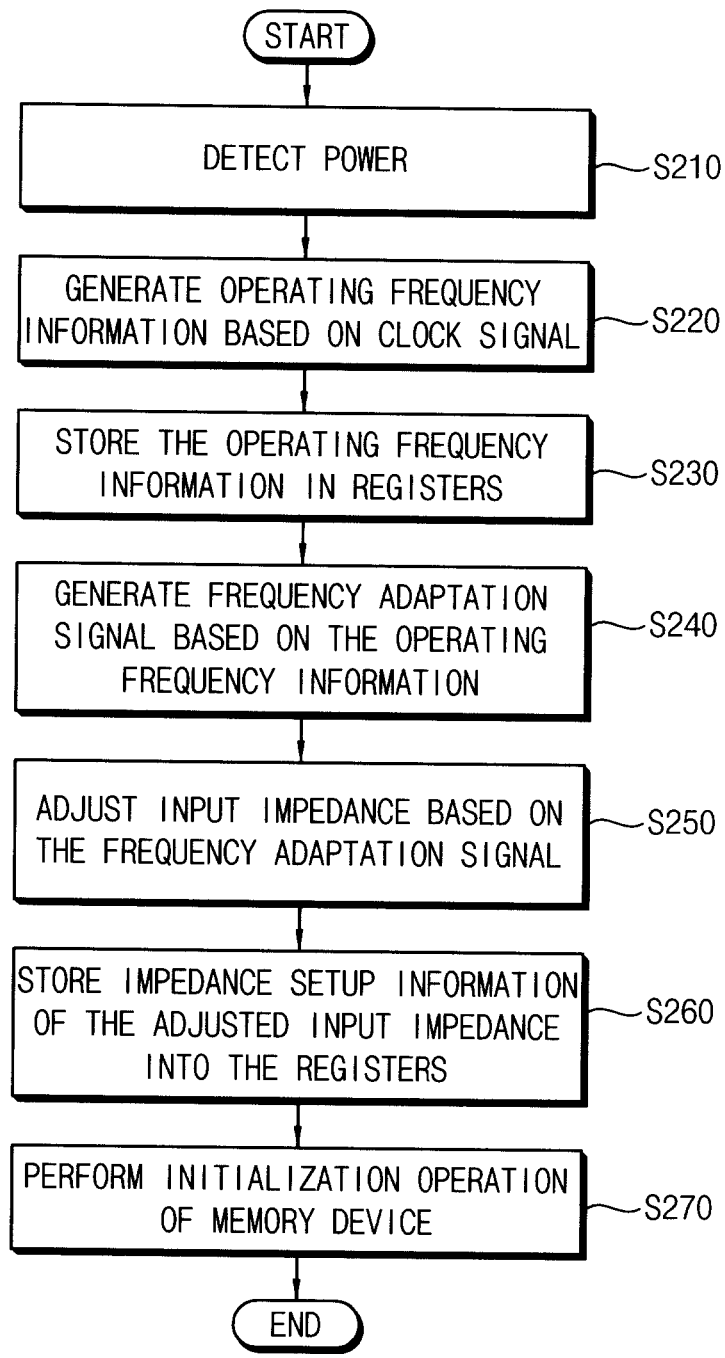
FIGS. 8 and 9 are flow charts illustrating exemplary embodiments of the method of FIG. 6.
Figure 9:
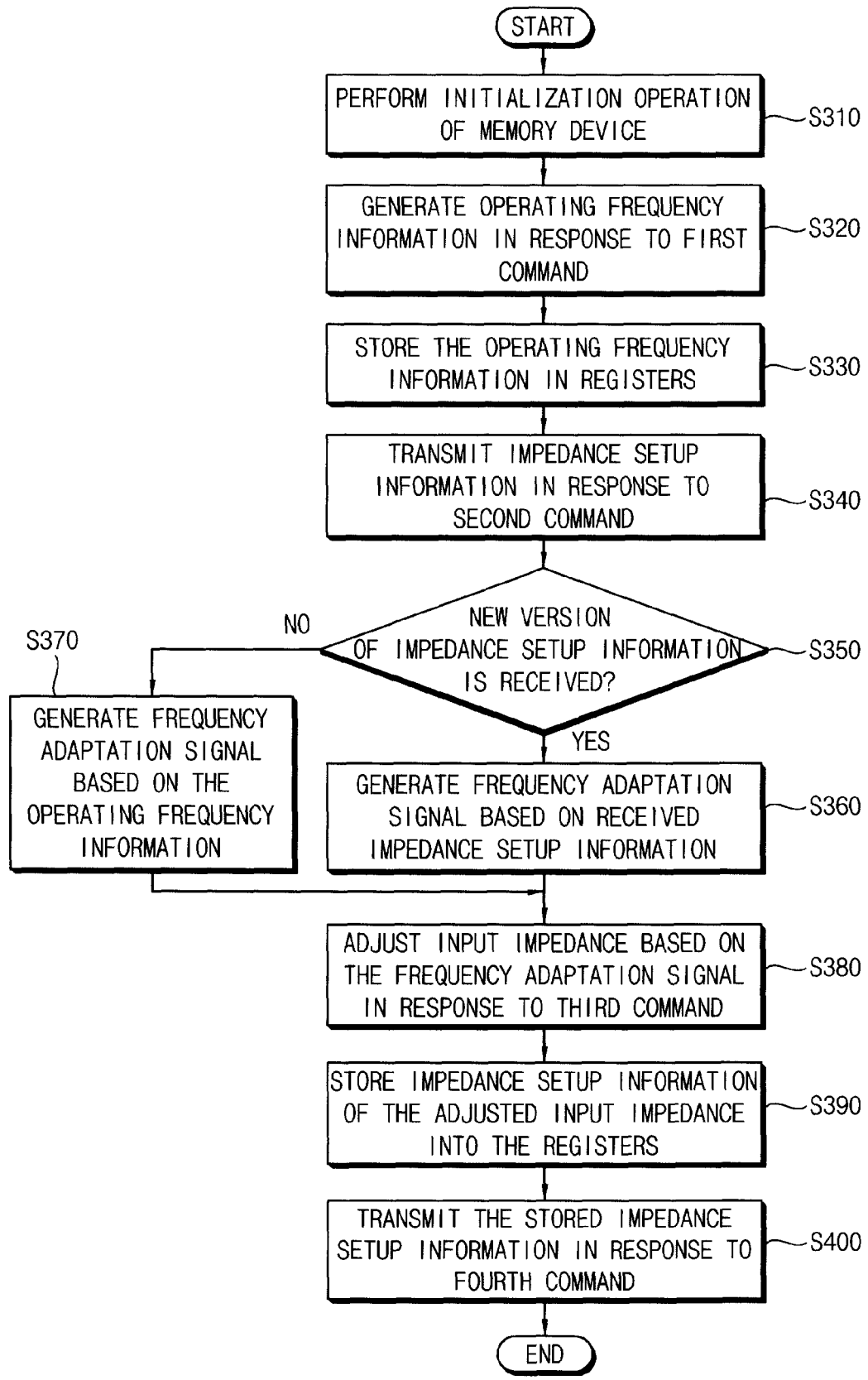

FIGS. 8 and 9 are flow charts illustrating more detailed examples of the method of FIG. 6.

Referring to FIGS. 1, 7 and 8, power being utilized in transmitting signals between the external host and the memory unit may be detected (S210). The operating frequency may be detected and the operating frequency information FQ may be generated based upon the detected operating frequency (S220). The generated operating frequency information FQ may be stored in registers of the memory device 12 (S230). In some exemplary embodiments, the frequency information FQ may be generated and transmitted by the external host. The frequency adaptation signal FCNT may be generated based upon the operating frequency information FQ (S240). In an exemplary embodiment, the frequency adaptation signal FCNT may be generated and transmitted by the external host. The input impedance of the memory device 12 may be adaptively adjusted based upon the frequency adaptation signal FCNT (S250). The impedance setup information indicating the adjusted input impedance may be stored in the registers of the memory device (S260). An initialization operation of the memory device 12 may be performed during the initialization mode (S270).

Where the memory device 10 performing the steps of FIG. 8 is an eMMC or MMC memory device, each of the steps may be performed during a card identification mode of the memory device 10. The impedance setup information and the operating frequency information FQ may be stored in a reserved region of extended card specific data (extended CSD) registers. The extended CSD registers represent registers that are defined according to Joint Electron Device Engineering Council (JEDEC) Solid State Technology Association standards for MMC or eMMC devices.

The reserved region of the extended CSD registers may be defined according to the JEDEC standards. For example, referring to MMC Association (MMCA) standard version 4.41, the impedance setup information and the operating frequency information FQ may be stored in reserved extended CSD register slices of which addresses correspond to [511:505], [501:247], [240], [237:236], [233], [227], [218], [216], [211]. [204], [197], [195], [193], [190], [188], [186], [184], [182], [180], [176], [174], [172], [170], [165], [135], [133:0]. The reserved extended CSD register slices may include the above defined region which excludes a pre-occupied region for MMC bus commands CMD0, . . . , CMD20, CMD23, . . . , CMD31, CMD35, CMD36, CMD38, . . . , CMD40, CMD42, CMD55, CMD56 and other pre-defined commands to perform the steps of FIGS. 6, 7, and 8. The reserved extended CSD register slices may correspond to the reserved region of the extended CSD registers.

Figure 13:
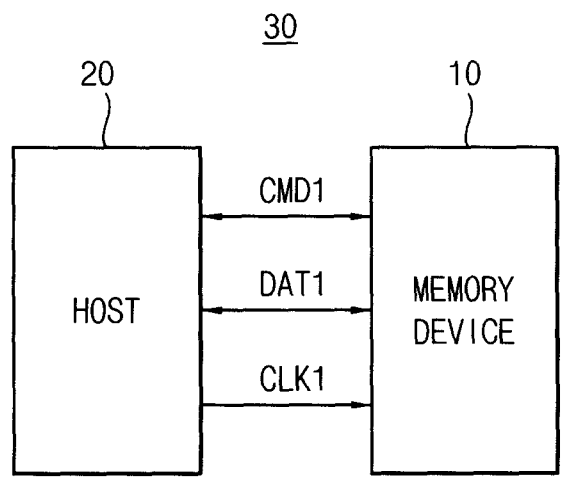
FIGS. 13 and 14 are block diagrams illustrating memory systems according to exemplary embodiments.
Figure 14:
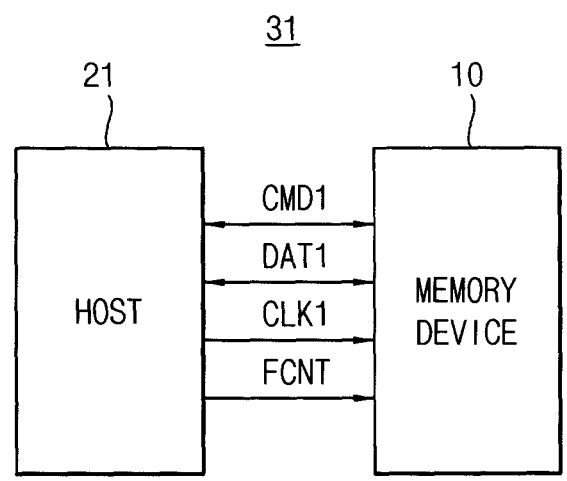

The steps of FIG. 8 may be performed by the memory device 10 of FIG. 1 and memory systems of FIGS. 13 and 14, and thus a repeated description will be omitted.

Referring to FIGS. 1, 7 and 9, an initialization operation may be performed on the memory device 10 (S310). The operating frequency information FQ may be generated based upon the clock signal CLK2 in response to a first command signal (S320). The operating frequency information FQ may be stored in registers (S330).

The impedance setup information of the front-end unit 100 may be provided to the external host in response to a second command (S340). When the memory unit 10 receives a new version of the impedance setup information from the external host (S350=YES), the frequency adaptation signal FCNT may be generated-based upon the received new version of the impedance information (S360). When the memory unit 10 does not receive a new version of the impedance setup information from the external host (S350=NO), the frequency adaptation signal FCNT may be generated based upon the operating frequency information FQ (S370).

The memory device 10 may adaptively adjust the input impedance in response to the third command (S380). The memory device 10 may store the impedance setup information of the adjusted impedance in the registers (S390). The memory device 10 may provide the stored impedance setup information to the external host in response to a fourth command (S400). As described below with reference to FIG. 10, the memory device 10 may transmit a response to the external host in response to each of the first command through the fourth command. The steps of FIG. 9 may be performed by the memory device 10 of FIG. 1 and memory systems of FIGS. 13 and 14, and thus a repeated description will be omitted.

Figure 10:
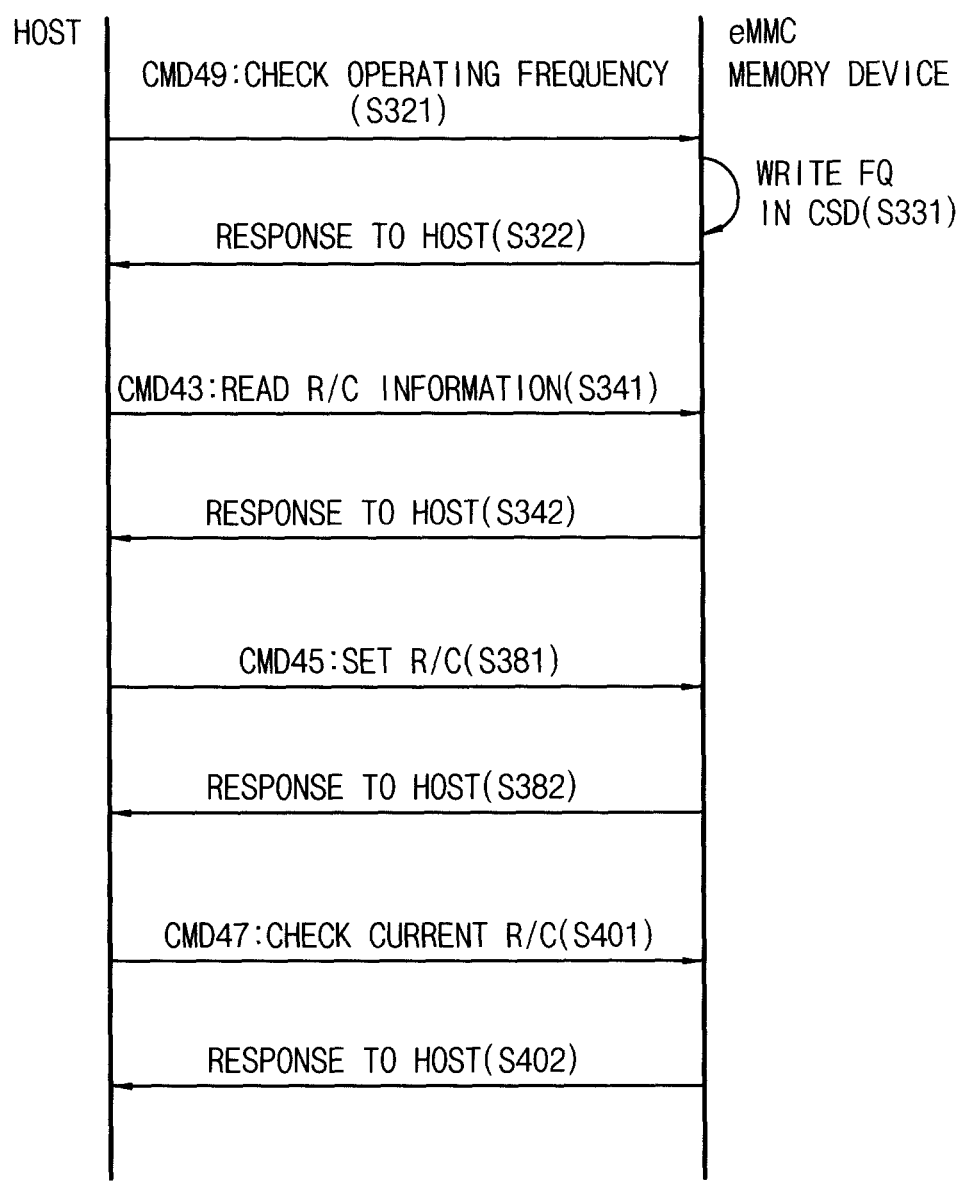
FIG. 10 is a message flow chart illustrating an exemplary embodiment of the method of FIG. 6.

FIG. 10 is a message flow chart illustrating an exemplary embodiment of the method of FIG. 6.

Referring to FIGS. 1 and 10, the interface initialization commands may be include four interface initialization commands CMD49, CMD43, CMD45, CMD47. The initialization commands CMD49, CMD43, CMD45, CMD47 may be defined in accordance with the JEDEC standards when the memory device 10 is an eMMC or a MMC memory device. For example, the initialization commands CMD49, CMD43, CMD45, CMD47 may be defined using reserved commands CMD21, CMD22, CMD32, CMD33, CMD34, CMD37, CMD41, CMD43, CMD54 according to the MMCA standards version 4.41. The reserved commands may be referred as a reserved command region. The initialization commands CMD49, CMD43, CMD45, CMD47 may be implemented using a portion of the reserved region, for example, CMD49, CMD43, CMD45, CMD47.

Referring again to FIGS. 9 and 10, the memory device 10 may receive the first command CMD49 and may generate the operating frequency information FQ by performing detection of an operating frequency of the clock signal CLK2 in response to the first command CMD49 (S321). The memory device 10 may write the operating frequency information FQ into the extended CSD registers (S331). The memory device 10 may transmit a first response to the external host (S322) and the first response may include the operating frequency information FQ.

The memory device 10 may receive the second command CMD43 to read the impedance setup information of the front-end unit 100 (S341). The memory device 10 may transmit a second response to the external host (S342) and the second response may include the impedance setup information.

The memory device 10 may receive the third command CMD45 to adjust the input impedance of the memory device 10 (S381). The memory device 10 may adaptively adjust the input impedance in response to the third command (S380 of FIG. 9). The memory device 10 may write the impedance setup information corresponding to the adjusted input impedance into the extended CSD registers (S390 of FIG. 9). The memory device 10 may transmit a third response to the external host (S382) and the third response may include information about whether the input impedance of the memory device 10 is set successfully. The memory device 10 may receive the fourth command CMD47 to transmit the impedance setup information corresponding to the adjusted input impedance (S401). The memory device 10 may transmit a fourth response to the external host (S402) and the fourth response may include the impedance setup information corresponding to the adjusted input impedance.

The steps of FIG. 10 is similar to steps of FIG. 9, except that the first through the fourth commands may be defined and implemented in the extended CSD registers of a eMMC or MMC memory device and that the memory device 10 may send the responses to the external host in response to the first through the fourth commands. Thus, a repeated description will be omitted.

Figure 11:
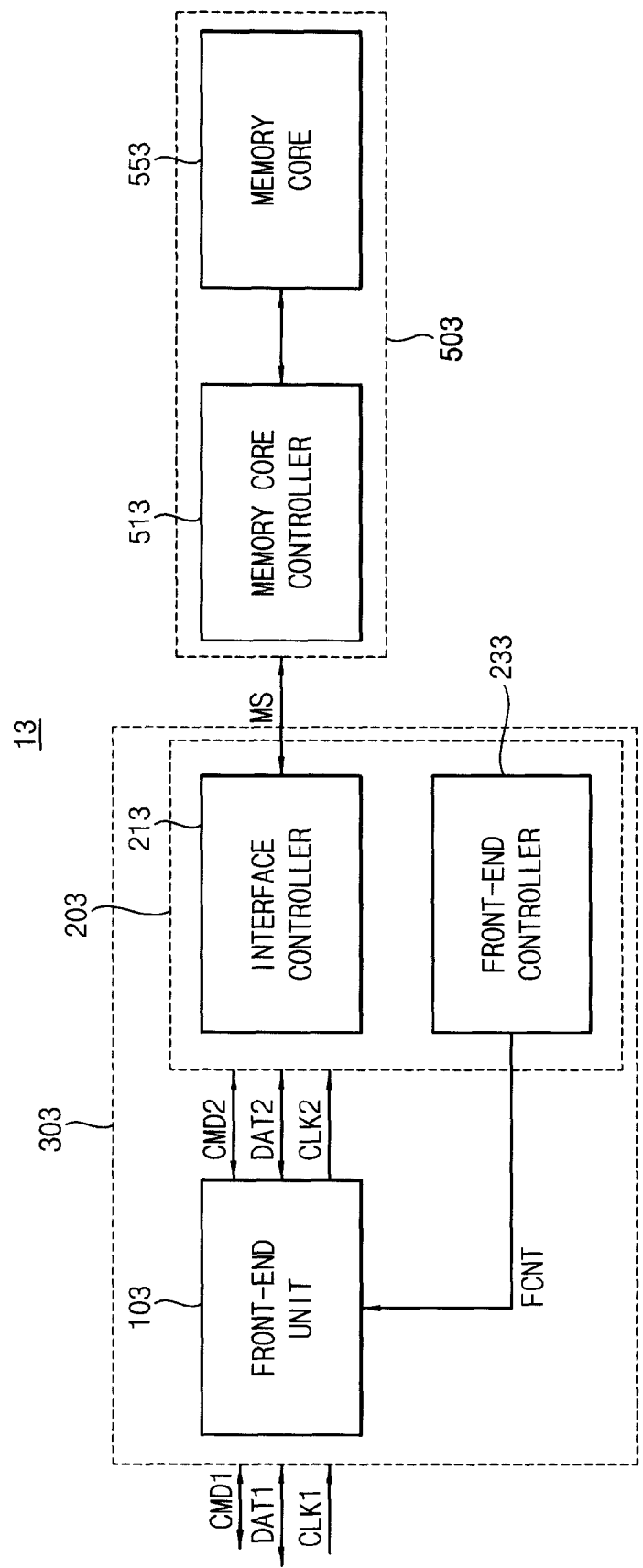
FIGS. 11 and 12 are block diagrams illustrating further exemplary embodiments of the memory device of FIG. 1.

FIGS. 11 and 12 are block diagrams illustrating other exemplary embodiments of the memory device of FIG. 1.

Referring to FIG. 11, a memory device 13 includes an interface unit 303 and a memory unit 503. The memory unit 503 may include a memory core controller 513 and a memory core 553. FIG. 11 illustrates exemplary embodiments adjusting the input impedance using internally implemented impedance controlling circuitry, based upon control signals that are generated externally rather than generated internally.

The interface unit 303 may include a front-end unit 103 and a control unit 203. The control unit 203 may include a front-end controller 233 and an interface controller 213. In an exemplary embodiment, the interface controller 213 may receive the frequency adaptation signal FCNT through the data signal DAT2 in response to the command signal CMD2 and may output the frequency adaptation signal FCNT to the front-end controller 233. In another exemplary embodiment, the interface controller 213 may receive the impedance setup information corresponding to an impedance value, to which the input impedance will be set, through the data signal DAT2 in response to the command signal CMD2. The interface controller 213 may generate the frequency adaptation signal FCNT based upon the impedance setup information and may output the frequency adaptation signal FCNT to the front-end controller 233. In this case, according to another exemplary embodiment, the front-end controller 233 may receive the impedance setup information to generate the frequency adaptation signal FCNT.

In contrast to the above described exemplary embodiments, the front-end controller 233 may receive the operating frequency information FQ through the data signal DAT1. For example, the front-end controller 233 may perform a receiving operation to receive the operating frequency information FQ transmitted through the data signal DAT1 in response to the command signal CMD1. The front-end controller 233 may generate the frequency adaptation signal FCNT based upon the operating frequency information FQ and may output the frequency adaptation signal FCNT to the front-end unit 103. Alternatively, the front-end controller 233 may generate the frequency adaptation signal FCNT based upon the impedance setup information received from the interface controller 213.

Referring to FIG. 12, a memory device 14 includes an interface unit 304 and a memory unit 504. The memory unit 504 may include a memory core controller 514 and a memory core 554. FIG. 12 illustrates exemplary embodiments adjusting the input impedance using internal implemented impedance controlling circuitry, based upon control signals that are generated by the external host based upon operating frequency information detected by the memory device 14.

The interface unit 304 may include a front-end unit 104 and a control unit 204. The control unit 204 may include a frequency detector 254 and an interface controller 214. In an exemplary embodiment, the frequency detector 254 may detect operating frequency of the memory device 14 by detecting frequency of the clock signal CLK1. The frequency detector 254 may generate the operating frequency information FQ based upon the detected frequency. The interface controller 214 may receive the operating frequency information FQ from the frequency detector 254 and may write the operating frequency information FQ in a memory space, for example, the extended CSD registers.

The interface controller 214 may control the memory unit 504 based upon the clock signal CLK1 and the internal control signal MS that is generated based upon the command signal CMD1 and the data signal DAT1. In an exemplary embodiment, the interface controller 214 may generate the impedance setup information based upon the operating frequency information FQ and may transmit the impedance setup information to the external host in response to the command signal CMD1 through the data signal DAT1. The external host may generate the frequency adaptation signal FCNT based upon the transmitted impedance setup information corresponding to an impedance value, to which the input impedance will be set. The external host may output the frequency adaptation signal FCNT to the front-end unit 104 of the memory device 14. The front-end unit 104 may adjust or set the input impedance of the memory device 14 based upon the frequency adaptation signal FCNT. In another exemplary embodiment, the interface controller 214 may transmit the operating frequency information FQ to the external host in response to the command signal CMD1 and may receive the impedance setup information from the external host in response to the command signal CMD1. The interface controller 214 may generate a digital code corresponding to the frequency adaptation signal FCNT based upon the received impedance setup information and may transmit the digital code to the external host through the data signal DAT1. The interface controller 214 may control the frequency detector 254 based upon the detecting control signal DCON generated internally or the data signal DAT1.

FIGS. 13 and 14 are block diagrams illustrating exemplary embodiments of memory systems in accordance with the present inventive concept.

Referring to FIG. 13, a memory system 30 includes a memory device 10 and a host 20. The memory device 10 may internally adjust the input impedance of the memory device 10 based upon at least one of a command signal CMD1 and a clock signal CLK1. The host 20 may perform interface operations using the command signal CMD1, the clock signal CLK1 and a data signal DAT1 without including impedance controlling circuitry to change the characteristics of data transmission between the memory device 10 and the host 20.

As described with reference to FIG. 1, the host 20 may communicate with the memory device using various interfaces such as eMMC interface. The host 20 may further include a command line CMD, a clock line CLK and a data line DAT to transmit the command signal CMD1, the clock signal CLK1 and the data signal DAT1, respectively. Moreover, although not illustrated, the host 20 may further include a clock generator to generate the clock signal CLK1 and an interface driving unit to drive the lines CMD, CLK, DAT. The host 20 may drive the command line CMD and the data line DAT in synchronization with the clock signal CLK1. The host 20 may transmit various data through the data line DAT which is different according to operating modes. The operational modes may include, for example, an initialization mode to initialize the memory device 10, a mode-selection mode to select one operating mode and a data communication mode. During the data communication mode, the host 20 may transmit the command signals CMD1 and the data signals DAT1 to the memory device 10 to store data into the memory unit 500. The host 20 may control the memory device 10 by providing the command signal CMD1 and the data signal DAT1 via interfaces such as the eMMC to store into or read-out from the memory unit 500 rather than directly controlling the memory core 550.

Referring to FIG. 1 and FIG. 13, the memory device 10 includes an interface unit 300 and a memory unit 500. The interface unit 300 may perform interface operations with the host 20 using the command line CMD, the data line DAT and the clock line CLK. The interface unit 300 may generate the operating frequency information FQ and may adaptively adjust the input impedance of the memory device 10. The memory device 10 of FIG. 13 is substantially the same with the memory device 10 of FIG. 1, and thus a repeated description will be omitted.

Referring to FIG. 14, a memory system 31 includes a memory device 10 and a host 21. The memory device 10 may internally adjust the input impedance of the memory device 10 based upon a command signal CMD1 and a clock signal CLK1. The host 20 may perform interface operations using the command signal CMD1, the clock signal CLK1 and a data signal DAT1 without including impedance controlling circuitry to change the characteristics of data transmission between the memory device 10 and the host 21. The memory device 10 of FIG. 14 is substantially the same with the memory device 10 of FIG. 1, and thus a repeated description will be omitted.

The host 21 may provide the frequency adaptation signal FCNT to the memory device 10. According to exemplary embodiments, the host 21 may generate the frequency adaptation signal FCNT or may receive the frequency adaptation signal FCNT from the memory device 10. Although not illustrated, the host 21 may further include additional driving circuitry to drive signal lines via which the frequency adaptation signal FCNT applied to the memory device 10.

The described embodiments may be employed by various electronic products including memory devices. Moreover, the inventive concept can be embodied in various electronic systems in which at least one memory device is embedded, such as, digital multimedia devices (e.g., an MP3 player, a digital camera, and a digital camcorder), hand-held devices (e.g., a personal digital assistant, a smart phone, and a cell phone), and the like.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims.

Although the memory device has been mainly described to have a certain number of interface lines used to communicate with the external host, exemplary embodiments may have various numbers of interface lines. Although the memory device has been mainly described to have a certain number of memory cores, resistive elements and capacitive elements, exemplary embodiments may have various numbers of the memory cores, the resistive elements and the capacitive elements. Although the memory device has been mainly described to internally adjust the resistive of capacitive elements defining the input impedance, exemplary embodiments may internally adjust other passive elements defining a communication environment which affects on the error rate of the transmitted data.

Therefore, it is to be understood that the foregoing disclosure, while illustrative of various exemplary embodiments, is not to be construed as limited to the specific exemplary embodiments disclosed, and that modifications to the disclosed exemplary embodiments, as well as other exemplary embodiments, are intended to be included within the scope of the appended claims.

What is claimed is:

1. A memory device comprising:
an interface unit configured to receive a clock signal, a command signal and a data signal from an external host, configured to internally adjust input impedance of the interface unit based upon at least one of the data signal and the clock signal, and configured to generate an internal control signal of the memory device based upon the command signal and the data signal; and
a memory unit configured to perform read/write operations based upon the internal control signal,
wherein the interface unit includes:
a control unit configured to generate a frequency adaptation signal based upon the clock signal; and
a front-end unit configured to adaptively adjust the input impedance based upon the frequency adaptation signal received from the control unit and configured to transmit the command signal, the clock signal and the data signal to the control unit through a plurality of interface lines, and
wherein the control unit is configured to receive operating frequency information through the data signal and to generate the frequency adaptation signal based upon the operating frequency information to output the frequency adaptation signal to the front-end unit.

2. The memory device of claim 1, wherein the control unit includes:
a frequency detector configured to detect a frequency of the clock signal to generate operating frequency information;
a front-end controller configured to output the frequency adaptation signal to the front-end unit based upon the operating frequency information; and
an interface controller configured to generate the internal control signal using the command signal and the data signal and configured to provide the internal control signal to the memory unit.

3. The memory device of claim 1, wherein the front-end unit includes:
at least one first circuit connected in series to a corresponding interface line of the interface lines and configured to adjust resistive impedance between the memory unit and the external host based upon the frequency adaptation signal; and
at least one second circuit connected between the corresponding interface line and a voltage line, and configured to adjust capacitive impedance between the memory unit and the external host based upon the frequency adaptation signal.

4. The memory device of claim 3, wherein the first circuit includes:
a plurality of resistive elements coupled in parallel to each other; and
a plurality of switch elements configured to be controlled based upon the frequency adaptation signal, each of the switch elements being coupled in series to a corresponding resistive element of the resistive elements.

5. The memory device of claim 3, wherein the second circuit includes:

a plurality of capacitive elements coupled in parallel to each other; and a plurality of switch elements configured to be controlled based upon the frequency adaptation signal, each of the switch elements being coupled in series to a corresponding capacitive element of the resistive elements.

6. The memory device of claim 1, wherein the interface unit further includes:

a power detector configured to detect a timing when power is supplied to generate a power-on signal, and wherein the control unit generates the frequency adaptation signal in response to the power-on signal.

7. The memory device of claim 1, wherein the control unit includes:

a front-end controller configured to receive operating frequency information trough the data signal and configured to generate the frequency adaptation signal based upon the operating frequency information to output the frequency adaptation signal to the front-end unit; and an interface controller configured to generate the internal control signal using the command signal and the data signal and configured to provide the internal control signal to the memory unit.

8. The memory device of claim 1, wherein the interface unit generates operating frequency information based upon the clock signal before an initialization mode of the memory device without external commands and adaptively adjusts the input impedance based upon the operating frequency information.

9. The memory device of claim 8, wherein the memory device is a multi-media card (MMC) memory device, wherein the initialization mode corresponds to an card identification mode of MMC interface, and wherein the interface unit stores the operating frequency information into reserved registers of card specific data (CSD) registers of the MMC memory device.

10. The memory device of claim 1, wherein the interface unit adjusts the input impedance based upon at least one interface initialization command received through the command signal, before a data communication mode.

11. The memory device of claim 10, wherein the memory device is a multi-media card (MMC) memory device, wherein the data communication mode corresponds to a data transfer mode of MMC interface, wherein the interface initialization command is defined using a reserved command region, and wherein the interface unit generates and stores impedance setup information into reserved registers of card specific data (CSD) registers of the MMC memory device.

12. The memory device of claim 10, wherein the interface initialization command includes a first command through a fourth command, wherein the interface unit detects frequency of the clock signal to generate the operating frequency information and stores the operating frequency information into registers of the interface unit, in response to the first command, wherein the interface unit transmits impedance setup information representing current setting of the input impedance, in response to the second command, wherein the interface unit generates a frequency adaptation signal based upon the operating frequency information and adjusts the input impedance based upon the frequency adaptation signal, in response to the third command, and wherein the interface unit modifies the impedance setup information based upon the adaptively adjusted input impedance, stores the modified impedance setup information into the registers and transmits the modified impedance setup information, in response to the fourth command.

13. The memory device of claim 1, wherein the interface unit receives operating frequency information from the external host, generates a frequency adaptation signal based upon the operating frequency information, and adaptively adjusts the input impedance based upon the frequency adaptation signal.

14. The memory device of claim 1, wherein the interface unit transmits operating frequency information generated based upon the clock signal to the external host and adaptively adjusts the input impedance based upon a frequency adaptation signal generated by the external host based upon the operating frequency information.

* * * * *